United States Patent [19]
Kellogg et al.

[11] Patent Number: 5,113,344
[45] Date of Patent: May 12, 1992

[54] MATERIAL HANDLING VEHICLE IDENTIFICATION TAG

[75] Inventors: David L. Kellogg, Greene; James M. Simmons, Jr., Newark Valley; Michael S. Bachman, Port Crane; Isaac Avitan, Vestal, all of N.Y.

[73] Assignee: Raymond Corporation, Greene, N.Y.

[21] Appl. No.: 558,938

[22] Filed: Jul. 27, 1990

[51] Int. Cl.$^5$ .............................................. G06G 7/00
[52] U.S. Cl. ........................ 364/424.04; 364/424.07; 364/571.04; 180/271
[58] Field of Search ...................... 364/424.01, 424.04, 364/424.05, 424.07, 571.04; 307/9.1, 10.1; 180/271, 282, 290; 340/685

[56] References Cited

U.S. PATENT DOCUMENTS

| | | | |
|---|---|---|---|
| 3,819,922 | 6/1974 | Horn et al. | 364/424.07 |
| 4,368,824 | 1/1983 | Thomasson | 364/424.07 X |
| 4,942,529 | 7/1990 | Avitan et al. | 364/424.01 |

Primary Examiner—Parshotam S. Lall
Assistant Examiner—Edward Pipala
Attorney, Agent, or Firm—Salzman & Levy

[57] ABSTRACT

The present invention features a material handling vehicle identification system. The material handling vehicle has a universal system processor for controlling the vehicle speed, acceleration, direction and motion of a plurality of different vehicles. A semiconductor memory device is permanently affixed to the chassis of the vehicle during the manufacturing process. This memory device contains a unique identification tag. The identification tag is remotely disposed from, but operatively connected to the system processor. The identification tag includes data for uniquely identifying the material handling vehicle. The system processor can control the performance of the vehicle as a function of the data in the identification tag, whereby the system processor becomes customized to operate consistant only with the vehicle in which it is installed.

20 Claims, 2 Drawing Sheets

MATERIAL HANDLING VEHICLE IDENTIFICATION TAG

BACKGROUND OF THE INVENTION

The present invention relates to identification systems and, more particularly, to identification systems for use on material handling vehicles.

Material handling vehicles, such as man-up fork lift trucks, often have certain operating limitations by which vehicle speed and geometry (sometimes referred to as base leg opening or stance) are related. In order to ensure stable operation of a vehicle, especially in the course of performing unusual operations, such as those involved with turning corners or making sudden maneuvers, geometry and operating parameters must be compatible.

Thus, a particular geometry in which a person is transported by the vehicle carriage at a given height above ground would normally allow only selected speeds or a predetermined maximum speed of the vehicle. In other words, the man-up vehicle may become unstable if either the velocity exceeds the predetermined maximum speed or the height of the carriage and its load above ground exceeds the predetermined height for that velocity.

A maximum speed for a fork lift truck decreases as the height of its load increases, since the maximum speed limit changes as the relative position of movable parts within a machine.

Simply stated, the maximum speed limit is a function of the load height. Vehicle stability, therefore, is a function of its geometry, such as: base leg opening or stance, turning radius, and vehicle weight, with or without load.

For the same load height, a more stable vehicle will have a higher maximum speed than a less stable vehicle.

Although manufacturers of material handling vehicles are very careful to design them to be stable for most conceivable situations, unauthorized replacements and substitutions of components in the field often change the stability of the vehicle in ways unintended by the manufacturer.

Such a situation can typically arise when a control processor is exchanged. In such a circumstance, the computer program that operates the vehicle may not be suitable for the new configuration, and instability becomes more likely.

Until this invention, material handling vehicles have not been successfully able to detect and relate to new configurations and operating parameters. Thus, occasional unstable situations will likely occur.

As far as is known, no one has ever attempted to use solid state electronic memory to maintain geometric identification.

In a prior generation vehicle, for example, a cammed, coded rail was arranged such that, as a load was lifted, a switch detected a series of on and off signals. The control system then translated these signals into an ID number, and modified its performance accordingly.

A more recent approach has been to allow the vehicle to adjust its performance according to inputs received. This adaptive learning method is discussed in a pending U.S. patent application, Ser. No. 07/199,782, filed May 26, 1988, for "Lift Truck Control System," assigned to the present assignee and incorporated herein by reference.

It would be advantageous to provide a system that would adjust the vehicle for the installation of mismatched components, especially electronic components, which might produce instability.

It would also be advantageous to provide a failsafe method and system by which a vehicle could not be operated unless its specified configuration or geometry were used with an appropriately suitable processing routine.

It would be advantageous to provide a generic control system which can automatically tailor its performance to the specific machine in which it is installed. The benefits of such a system would be many, such as: (1) ease of installation, (2) ensured stability, (3) elimination of the need to configure switches or firmware for the specific vehicle, and (4) elimination of inadvertent and unauthorized installations of control systems that will produce an unsuitable or dangerous configuration.

Sophisticated material handling vehicles may be purchased with many operational features. Such options typically include, but are not necessarily limited to: improved hardware and/or software, sophisticated electric battery discharge tracking capabilities, or mechanisms by which the carriage descends at a variable rate of speed as a function of its relative position with the floor.

Any option that is included in a vehicle should be controlled by suitable software, which software should be able to determine the vehicle configuration.

It is customary practice to provide each manufactured vehicle with all the aforementioned options. Access to any one or more options requires proper authorization. Likewise, certain options cannot be enabled by certain users. In this manner, the vehicle is customized to customer specifications, utilizing authorized manufacturing techniques.

It would be advantageous, therefore, to monitor such options and limit operating characteristics of the vehicle in accordance with safe practices and procedure.

SUMMARY OF THE INVENTION

The present invention features a material handling vehicle identification system. The material handling vehicle is provided with a system processor for controlling the vehicle speed, acceleration, direction and motion. A small, non-volatile semiconductor memory device is permanently affixed to the chassis of the vehicle during the manufacturing process. This memory device contains an identification tag comprising geometric information which is unique to the class of vehicle in which it is installed. The identification tag is remotely disposed from, but operatively connected to the system processor. The identification tag includes data for uniquely identifying the material handling vehicle. Every vehicle or class of vehicle is assigned a unique identifier which can be read by the system processor. The system processor can control the performance of the vehicle as a function of the data in the identification tag. The system processor can recognize a number of different ID tags and perform in accordance with the identity of its host vehicle.

The process of reading the ID tag is automatic and requires no human intervention, either during normal operation or during repair or modification of the control system.

When the vehicle is turned on, the ID tag is read and the correct relationship between height and travel speed is selected.

BRIEF DESCRIPTION OF THE DRAWINGS

A complete and better understanding of the present invention may be obtained by reference to the accompanying drawings, considered in conjunction with the detailed description, in which.

DESCRIPTION OF THE PREFERRED EMBODIMENT

Figure 1:
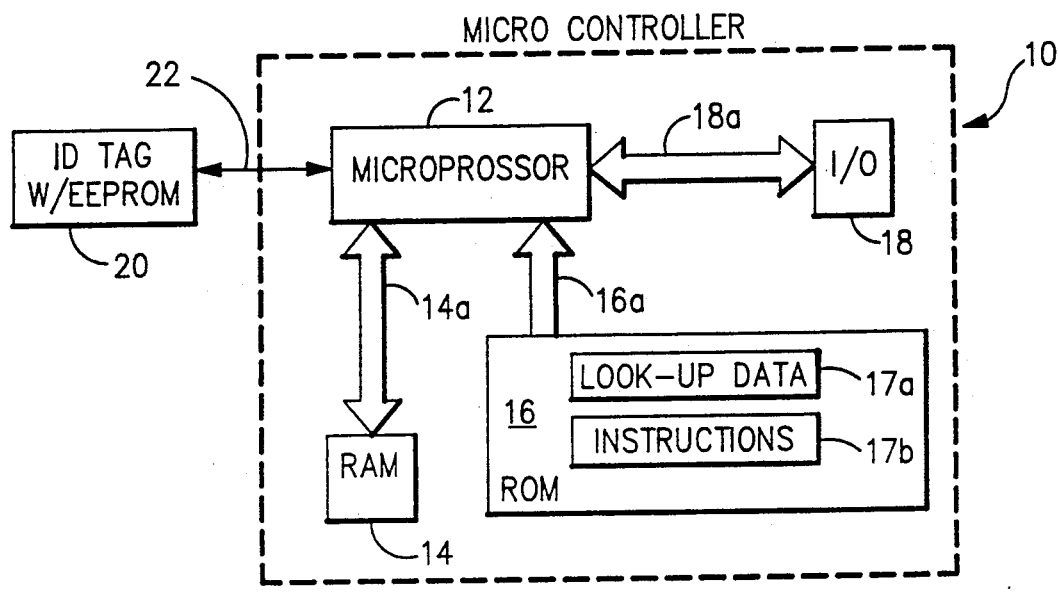
FIG. 1 is a block diagram of the control mechanism for a material handling vehicle, in accordance with the present invention.

Referring now to FIG. 1, there is shown a block diagram of the control mechanism for a material handling vehicle, not shown.

A microcontroller or system processor, shown generally by reference numeral 10, includes a Model No. 68HC11 microprocessor 12 manufactured by Motorola Co.

The microprocessor 12 is connected to an (8K×8) RAM 14, a (32K×8) ROM 16 and I/O devices 18, by means of suitable 8-bit data transfer paths 14a, 16a and 18a, respectively.

ROM 16 has a look-up table stored therein containing data 17a and instructions 17b, which comprises a plurality of independent algorithms.

An identification (ID) tag 20 is mounted at a location physically remote from microcontroller 10. The tag 20 is connected to the microprocessor by line 22. The tag 20 can be mounted in a display panel of a vehicle normally used by the vehicle operator. ID tag 20 must be physically fastened to the chassis of the vehicle so that it cannot be readily or unintentionally removed from the vehicle.

A removable ID tag 20 would defeat its purpose, which is to provide identification information about the specific vehicle in which it is mounted.

ID tag 20 is a Model No. X2444, serial 16×16 bit static RAM overlaid with a non-volatile EEPROM array, manufactured by XICOR Corp. The EEPROM is programmed at the factory with a code number which is unique to the physical geometry of the vehicle. The ROM 16 contains the program for the processor 12, and comprises all the possible operating instructions and data for each code number.

In this manner, the microcontroller is universally operative for every vehicle, i.e. every tag or system configuration.

Each code of tag 20 is associated with parameters governing the safe operating limits of the specific vehicle in which it is installed. ID tag 20 is designed for a great number of write operations. It is operatively connected to microcontroller 10 by means of a conventional synchronous serial interface 22 in the preferred embodiment. However, any suitable interface can be used.

Although data can be written into the EEPROM of tag 20, only certain locations can be written. The system processor 12 is prevented from writing into a limited number of EEPROM locations, as is the case with the serial number of the vehicle. The serial number and other information of the vehicle can be programmed only during the manufacturing assembly process via another mechanism.

On the other hand, some locations can be changed by the system processor. These alterable locations are used to implement a counter mechanism, not shown. Since the tag is permanently fixed to the chassis of the vehicle, the counter mechanism will remain with the truck.

An obvious use for the counter mechanism is to implement an hour meter. After every unit of time, the counter is incremented. Programming is provided so that the value of the hour meter can be retrieved and displayed for inspection.

Another use for the counter mechanism is to calculate maintenance intervals based on cumulative cycle counts. For example, motor brush maintenance could be performed after every predetermined number of rotations of the drive motor. Hydraulic oil could be changed after every predetermined number of lift/-lower cycles of a fork lift.

If an alterable memory is used to contain the ID tag, then it is possible to implement counters and timers which record events pertinent to maintenance and diagnostics. Since this information is associated with the chassis of the vehicle, it will remain even when the system processor is replaced or repaired.

Figure 2:
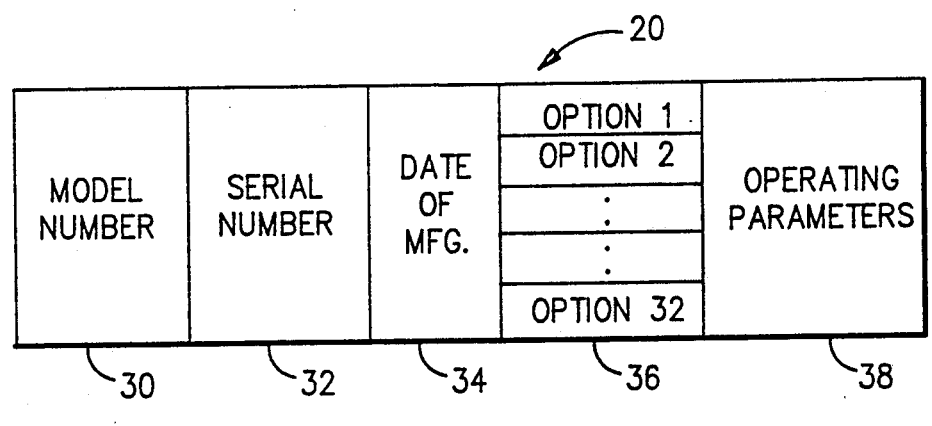
FIG. 2 is a block diagram of the internal structure of the ID tag shown in FIG. 1.

Referring now also to FIG. 2, there is shown a block diagram of the structure of the ID tag 20 (FIG. 1) in greater detail.

The structure of ID tag 20 as illustrated herein is exemplary, and may be configured differently, as will occur to those skilled in the art.

As used by the present invention, the tag 20 includes fields for various subsets of data, as described hereinbelow.

The model number of the vehicle is stored in field 30; the serial number of the vehicle is stored in field 32; the date of manufacture of the vehicle is stored in field 34; a plurality of options numbered 1 through 32 are stored in field 36; and operating parameters are stored in field 38.

Operating parameters stored in field 38 are the coefficients for the algorithm of Equation 1, shown below, which defines the maximum speed of a vehicle as a function of its current operating characteristics, such as height of its carriage, its heading angle, etc.

$$V = F(C_1 - C_2 L - C_3 H)(1 - A_s/C_4) \qquad \text{(Eq. 1)}$$

where V is the instantaneous velocity, as measured at the drive wheel, below which the aforementioned resultant vector points within the axes 6 and 8. F is a factor depending on forward or reverse travel. L is the payload on the load carriage. H is fork elevation. $A_s$ is heading angle, and $C_1$ through $C_4$ are constants associated with a particular vehicle type and configuration.

The aforementioned algorithm of Equation 1, is a first degree, linear equation. There is no reason, however, to limit such an algorithm to such simplified form, and other definitions of speed control may be used as befits the skilled practitioner of this art. For example, it is possible to provide a plurality of equations, some being linear, others being quadratic, etc. As long as the coefficients are derived or obtained from the system processor and/or information encoded in ID tag 20, as described hereinbelow, one equation may be used in a number of different ways with different coefficients.

Figure 3:
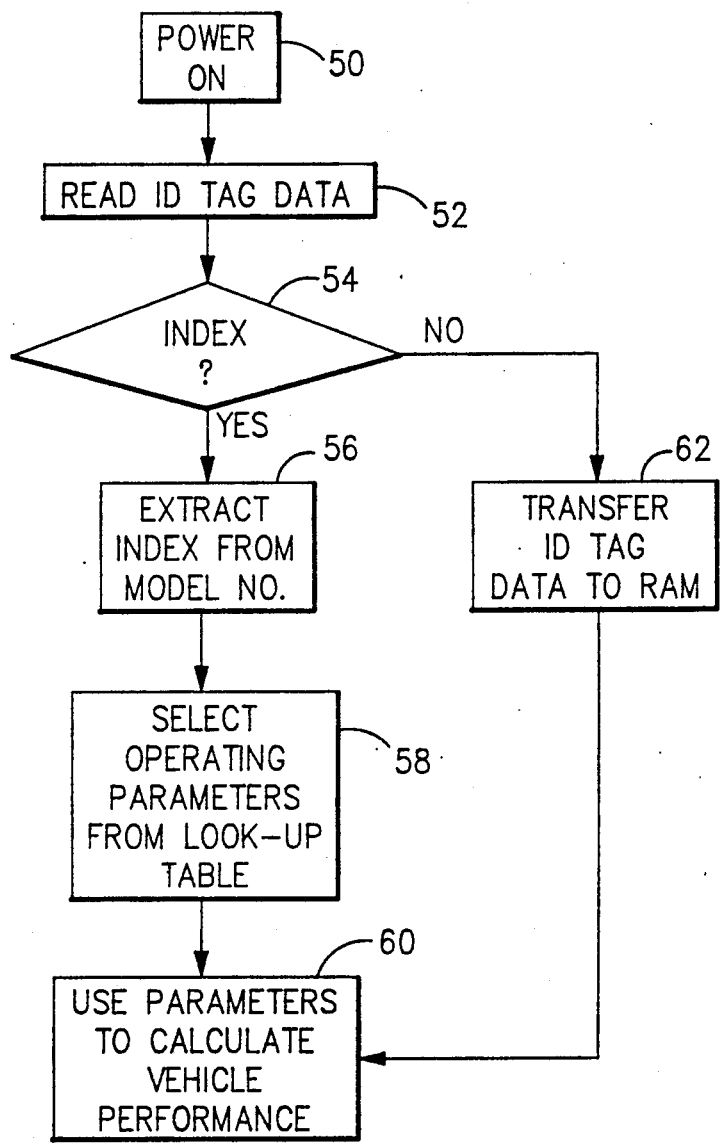
FIG. 3 is a flow chart of the operation of the control mechanism of FIG. 1, in a preferred, and in an alternate, embodiment.

Referring now to FIG. 3, there is shown a flow chart of the operation of the microcontroller system of FIG. 1.

The vehicle and system processor are turned on, step 50. All the data (FIG. 2) stored in the ID tag 20 of FIG. 1 is read by microprocessor 12, step 52.

If one or more of the bits associated with an option in field 36 of ID tag 20 indicates that the system is to be used as an index with look-up table 17a, step 54, the index is extracted from the model number, step 56.

The algorithm shown as Equation 1, above, includes a number of coefficients $C_1, C_2, C_3, C_4$. The source of the coefficient values can be derived from look-up table 17a (FIG. 1), in which case indexing is required to locate the appropriate portion of the look-up table. Conversely, the coefficients can be obtained from information stored in ID tag 20. Specifically, the vehicle model number itself may be encoded, so that an appropriate decoding scheme can be used to derive or obtain the coefficients directly from the model number itself. The model number in field 30 of ID tag 20 can be used to select which of a family of algorithms can be used.

The appropriate operating parameters are selected from look-up table 17a, step 58. The parameters so obtained are used to calculate vehicle performance, step 60.

If, however, the bit(s) representing an option in field 36 of ID tag 20 indicate that the system is not indexed i.e., one of the aforementioned plurality of algorithms in instructions 17b of ROM 16 is to be used for the calculation, step 54, then the ID tag data is transferred to RAM 14, step 62.

At this point, the obtained parameters are used to calculate vehicle performance, step 60. In other words, once operating parameters are selected, the operation of the truck is then governed by the corresponding performance calculation.

ID tag 20 may contain information regarding options sold with the vehicle. This information is programmed into ID tag during manufacture. During operation, the system processor exhibits only those features and options which are enabled in the ID tag. In this way, the ID tag 20 can be used to ensure that an option which is purchased for a particular vehicle is installable only on the intended vehicle.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. An operating and identification system for a material handling vehicle, comprising:
    a) a system processor supported by a material handling vehicle, said system processor having a program for controlling a plurality of different vehicles, one of which is a specific material handling vehicle in which an identification means is installed to ensure its specific, proper operation; and
    b) a non-removable identification means remotely disposed upon the material handling vehicle from said system processor, said identification means being specific for the material handling vehicle to which it is disposed, said identification means being operatively connected to said system processor for supplying said system processor with data for uniquely identifying said material handling vehicle and defining its proper operation, whereby said system processor can process operating data and instructions specific to said material handling vehicle in which said non-removable identification means is disposed.

2. The material handling vehicle operating and identification system in accordance with claim 1, wherein said identification means comprises an EEPROM.

3. The material handling vehicle operating and identification system in accordance with claim 2 wherein the program of said system processor comprises means for controlling the performance of said material handling vehicle as a function of speed control parameters specifically contained in the data of said identification means.

4. The material handling vehicle operating and identification system in accordance with claim 3, wherein said system processor comprises a memory for storing a plurality of algorithms, said algorithms including data representative of vehicle load height, loading weight and steering direction for a plurality of different vehicles, and wherein said program of said system processor selects the specific memory algorithm defined by data received from said identification means.

5. The material handling vehicle operating and identification system in accordance with claim 4, wherein said identification means comprises index information by which said program of said system processor can select one of said plurality of memory algorithms.

6. The material handling vehicle operating and identification system in accordance with claim 5, wherein said system processor memory comprises a ROM.

7. The material handling vehicle operating and identification system in accordance with claim 3, wherein said system processor comprises a memory for storing a vehicle control algorithm, said memory receiving data from said identification means for ensuring stable vehicle operation specific to said material handling vehicle identified by said identification means.

8. The material handling vehicle operating and identification system in accordance with claim 7, wherein said system processor memory comprises a ROM.

9. The material handling vehicle operating and identification system in accordance with claim 5, wherein said data of said identification means is accessed by said program for ensuring stable vehicle operation that is specific only to the material handling vehicle identified by said identification means.

10. A universal operating and identification system for a plurality of material handling vehicles, said operating and identification system being customized to each specific material handling vehicle in which it is installed, comprising:
    a) a universal system processor for installation in one of a plurality of material handling vehicles, said universal system processor being operative to control any one of said plurality of material handling vehicles by means of a program for controlling said plurality of different vehicles, said universal system processor program being customized to operate in a specific material handling vehicle in which it is installed, to insure proper operation of that specific material handling vehicle; and
    b) a customizing, identification means installed within a material handling vehicle containing said universal system processor, said identification means being operatively connected to supply said system processor with data for uniquely identifying said material handling vehicle and for defining its proper operation.

11. The universal operating and identification system in accordance with claim 10, wherein said identification means comprises an EEPROM.

12. The universal operating and identification system in accordance with claim 11, wherein the program of said system processor comprises means for controlling the performance of said material handling vehicle as a function of speed control parameters specifically contained in the data of said identification means.

13. The universal operating and identification system in accordance with claim 12, wherein said system processor comprises a memory for storing a plurality of algorithms, said algorithms including data representative of vehicle load height, loading weight and steering direction for a plurality of different vehicles, and wherein said program of said system processor selects the specific memory algorithm defined by data received from said identification means.

14. The universal operating and identification system in accordance with claim 13, wherein said identification means comprises index information by which said program of said system processor can select one of said plurality of memory algorithms.

15. The universal operating and identification system in accordance with claim 14, wherein said system processor memory comprises a ROM.

16. The universal operating and identification system in accordance with claim 12, wherein said system processor comprises a memory for storing a vehicle control algorithm, said system processor memory receiving data from said identification means for ensuring stable vehicle operation specific to said material handling vehicle identified by said identification means.

17. The universal operating and identification system in accordance with claim 16, wherein said system processor memory comprises a ROM.

18. The universal operating and identification system in accordance with claim 10, wherein said data of said identification means is accessed by said program for ensuring stable vehicle operation that is specific only to the material handling vehicle identified by said identification means.

19. The universal operating and identification system in accordance with claim 10, wherein said identification means comprises a non-removable tag that is installed in a remote location upon said material handling vehicle, from that of said system processor.

20. A method of customizing a material handling vehicle to perform system operations specific to that particular material handling vehicle, comprising the steps of:
   a) installing a universal-type system processor in said material handling vehicle, said universal-type processor being operative to process data and information for a plurality of different material handling vehicles; and
   b) installing and operatively connecting an identification tag to said universal-type processor for identifying the specific vehicle to which it is installed, said identification tag containing information and data specific to the operation of said vehicle, whereby said universal-type processor will only operate in a manner consistant with the vehicle in which it is installed.

* * * * *